Sept. 10, 1968      S. P. BURG      3,400,650
CONTROLLED ATMOSPHERE STORAGE SYSTEM FOR PLANT MATERIAL
Filed Sept. 30, 1964
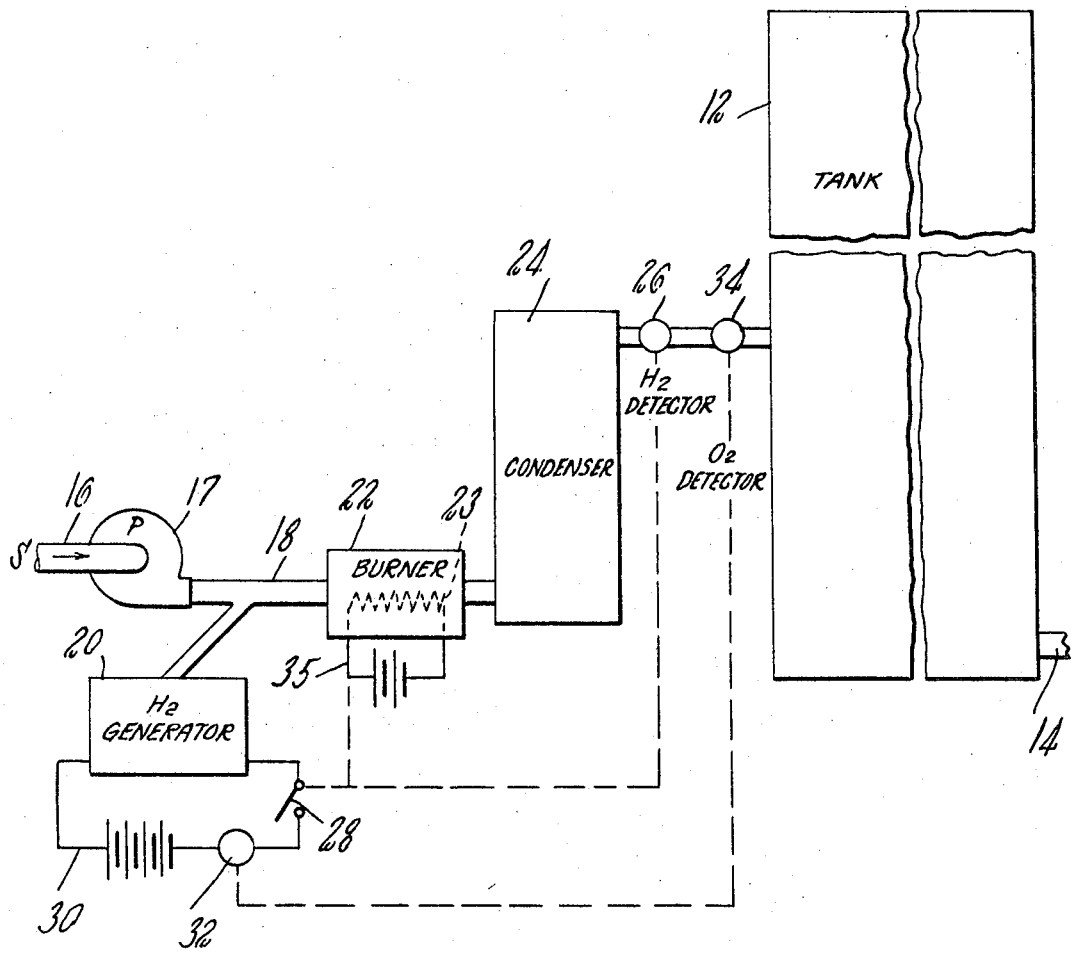

United States Patent Office 3,400,650
Patented Sept. 10, 1968

3,400,650
CONTROLLED ATMOSPHERE STORAGE SYSTEM FOR PLANT MATERIAL
Stanley P. Burg, Coconut Grove, Miami, Fla., assignor to United Fruit Company, Boston, Mass., a corporation of New Jersey
Filed Sept. 30, 1964, Ser. No. 400,540
7 Claims. (Cl. 99—271)

ABSTRACT OF THE DISCLOSURE

Controlled atmosphere storage system having a storage chamber with air inlets and outlet means and located between the air inlet and the chamber, an electrolytic hydrogen generator, a burner for igniting hydrogen gas, a condenser for cooling oxygen-depleted air and means for controlling the amount of treated air entering the storage chamber.

---

This invention relates to the production from a source of air of an atmosphere having a reduced oxygen tension and useful, for example, as an environment, capable of being replenished, for storing fruits, including bananas, vegetables or any other living plant material during transport or otherwise, and to storage systems utilizing such environments.

It has heretofore been proposed (see U.S. Patent No. 3,102,778) to reduce the oxygen content of air for such purposes by burning a hydrocarbon fuel in the presence of the air to produce a flue gas having a lowered oxygen content compared to its normal content in air. Such flue gases are, however, contaminated with incombustible ingredients of the hydrocarbon fuels, necessitating incorporation of troublesome filtering media and other cleansing devices to insure that such impurities do not contaminate the commodity being stored nor adversely affect the reduction in ripening rate which is being sought for in the storage chamber.

The present invention overcomes the above disadvantages by utilizing hydrogen gas as the oxygen removal agent, thereby avoiding the carbonaceous or other hydrocarbon impurities that are introduced with a hydrocarbon fuel and completely obviating the necessity for removing them. Moreover, the hydrogen gas is generated on the site and only as needed, thus avoiding transport of special hydrogen gas containers which can become exhausted at critical times, as in truck transport where delays are encountered. Rather, the hydrogen gas is generated, as it is needed, by the electrolytic dissociation of $H_2O$, with injection of the hydrogen gas as it is generated directly and immediately into the flowing air stream. Electric power, which is normally readily available in transport vehicles, rather than special fuels, not normally present in vehicles, can thus be used; and the hydrogen is generated and injected into the air stream at any rate required to remove any desired portion of the reactive oxygen present, while consuming all the hydrogen as it is generated to obviate any substantial, and hence dangerous, accumulation of the hydrogen gas at any point in the installation.

A further advantage is that only water and electricity are consumed, which are always readily available en route, rather than special fuels not readily available en route.

The rate of electrolytic generation of the hydrogen can be very uniform for complete consumption as it is injected into an air stream having a constant rate of flow.

Also, the rate of generation may be readily varied to vary the final reduced oxygen content, simply by varying the energy input into the electrolytic generator. Thus, a simple voltage regulator may be coupled to an oxygen detector interposed in the air stream downstream from the hydrogen burner so that the current input to the electrolytic generator can be varied directly with respect to any desired setting of the oxygen detector, varying from 1 to 21 percent oxygen. Similarly, a hydrogen gas detector interposed in the flowing air downstream from the hydrogen gas burner can be coupled with a switch in the electric input lines to the generator to break the circuit whenever the generated hydrogen remains unconsumed by reason of burner failure or for any other reason, thus shutting down the generator to avoid explosive hydrogen gas levels at the point of use. Hydrogen detectors are commercially available which are sensitive to any level of hydrogen gas above .01 percent by volume in the flowing gas stream, which is a safe maximum.

Apparatus suitable for practicing the method of this invention is shown diagrammatically in the accompanying drawing.

A storage tank 12, indicated in the drawing as being of any desired capacity, has an outlet 14. The atmosphere exhausing through outlet 14 is continuously replaced by treated air which originates from a source of air supply S and proceeds through a series of conduits from an inlet 16 into the storage chamber 12, propelled by an air pump or fan 17.

An electrolytic hydrogen generator 20 communicates with the conduit 18 so that hydrogen gas is aspirated into the flowing air stream. The mixed gases then proceed through a burner 22 where they encounter a red hot electric resistance element in the form of a filament 23 which acts as means to ignite the hydrogen in the presence of the reactive oxygen content of the air stream. Such a filament is especially efficacious in assuring consumption of oxygen down to low tensions without leaving unconsumed hydrogen gas. Normal jet burners are likely to be extinguished when the oxygen gets down to say, 5 percent or lower—creating a hazard of accumulating unburned hydrogen gas.

The conduit leads the burned gas from burner 22 into an air-cooled condenser which cools the oxygen-depleted air to a desired commodity storage temperature, simultaneously condensing excess water vapor resulting from the reaction of the hydrogen gas with reactive oxygen supplied by the air, and leaving the air stream water saturated at the desired food storage temperature.

Downline from the condenser is a hydrogen gas detector (thermal conductivity cell) 26 which is coupled through a relay device with switch 28 contained in the electrical circuit 30 which drives the hydrogen generator. This hydrogen detector constitutes a safety device insuring that, if the hydrogen gas is generated at too fast a rate or if the burner otherwise fails to consume the injected hydrogen gas, no dangerous accumulation of explosive hydrogen gas will build up in the storage tank 12. Such a hydrogen detector can be set, for example, to break the circuit through switch 28 with the detection of any amount of hydrogen gas in the air stream at the point of detection above 0.01 percent by volume. In addition, the burner circuit 35 is coupled through a relay to switch 28, in such a manner that should the current drop below a predetermined level needed to maintain the filament at a red glow or should the filament circuit in any other way malfunction, the $H_2$ generator will automatically be shut down.

Electrical circuit 30 also includes a voltage regulator 32 which is coupled by suitable control means, as known in the art, to an oxygen detector 34 of known type which monitors the oxygen content in the art stream to any desired percentage between 1 and 21 percent by varying the voltage across the electrodes and hence the current input to the hydrogen generator, thus controlling the rate of generation of the hydrogen gas to that corresponding to the particular reduced oxygen content for which the oxygen detector is variably set.

In the storage of certain commodities, the tank 12 may be insulated and refrigerated. However, in the case of green bananas, samples have been held in a system such as that just described at 24 C. with a 5 to 7 percent oxygen tension and showed no desiccation, mold development, or substantial ripening over a period of fourteen days, as compared with control samples which broke color after six days and were completely ripened in nine days at the same temperature and rate of air flow but with an oxygen content that of normal air. In both cases the delivering rate to the tank was about 1 liter per hour per each 7.5 liter internal tank volume. In both these experiments the air was water saturated at the point of introduction into the storage chamber.

What is claimed is:

1. A controlled atmosphere storage system for living plant material comprising a chamber for containing a stored living plant material, an air inlet to said chamber, an outlet from said chamber, means between said inlet and said chamber for reducing the oxygen content of air passing through said inlet into said chamber comprising an electrolytic hydrogen generator having communication with air passing through said inlet for generating and injecting hydrogen gas as it is generated directly into said air as it flows towards said chamber, means for igniting the hydrogen gas immediately after it has been injected into said air to consume said hydrogen and reduce the oxygen content of the air, means for cooling said oxygen-depleted air after said hydrogen has been consumed, means for passing said cooled oxygen-depleted air into said chamber, and gas detector means interposed in said inlet downstream from said ignition means for controlling the amount of hydrogen gas injected into said air stream relative to the amount of air passing through said inlet.

2. Apparatus as claimed in claim 1, wherein said igniting means is a hot filament.

3. Apparatus as claimed in claim 1 wherein said igniting means is an electric resistance element, and said apparatus includes electric circuits for supplying electrical current to said generator and to said element, a switch in said generator circuit, and means for actuating said switch to break said generator circuit responsive to a current drop in said element circuit below a predetermined value.

4. Apparatus as claimed in claim 1 further characterized in that said gas detector means includes an oxygen gas detector and said hydrogen generator includes an electrical circuit for supplying electrical energy to said generator, and a voltage regulator is interposed in said circuit for controlling the voltage across said generator and said voltage regulator is responsive to variations in the oxygen content of said air stream as detected by said oxygen gas detector.

5. Apparatus as claimed in claim 1 having a circuit for supplying electrical current to said generator, a switch in said circuit, and further characterized in that said gas detector means is a hydrogen gas detector, said hydrogen gas detector being operatively connected to said switch to break said circuit whenever the hydrogen gas detected in said flowing stream by said hydrogen gas detector exceeds a predetermined amount.

6. Apparatus as claimed in claim 1 further characterized in that said gas detector means includes a hydrogen gas detector and an oxygen gas detector.

7. Apparatus as claimed in claim 6 further characterized in that said hydrogen generator includes an electrical circuit for supplying electrical energy to said generator, a voltage regulator is interposed in said circuit for controlling the voltage across said generator and said voltage regulator is responsive to variations in the oxygen content of said air stream as detected by said oxygen gas detector, a switch is in said circuit and said hydrogen gas detector is operatively connected to said switch to break said circuit whenever the hydrogen gas detected in said flowing stream by said hydrogen gas detector exceeds a predetermined amount.

References Cited

UNITED STATES PATENTS

| | | | |
|---|---|---|---|
| 3,203,771 | 8/1965 | Brown et al. | 23—281 |
| 3,205,049 | 8/1965 | Lannert et al. | 23—281 |
| 3,102,778 | 9/1963 | Bedrosian et al. | 99—154 |
| 1,581,944 | 4/1926 | Hausmeister | 204—230 |

FOREIGN PATENTS

| | | |
|---|---|---|
| 5,030 | 1879 | Great Britain. |
| 6,417 | 1887 | Great Britain. |

RAYMOND N. JONES, *Primary Examiner.*